United States Patent [19]

Yockey

[11] Patent Number: 5,640,062
[45] Date of Patent: Jun. 17, 1997

[54] ALTERNATOR WITH INTERNAL RECTIFIER BRIDGE ASSEMBLY

[75] Inventor: Steven John Yockey, Farmington Hills, Mich.

[73] Assignee: Ford Motor Company, Dearborn, Mich.

[21] Appl. No.: 208,323

[22] Filed: Mar. 10, 1994

[51] Int. Cl.⁶ .................................... H02K 11/00
[52] U.S. Cl. .................. 310/68 D; 310/68 B; 310/71; 363/145
[58] Field of Search .................. 360/68 D, 71, 360/68 B; 363/145

[56] References Cited

U.S. PATENT DOCUMENTS

| | | | |
|---|---|---|---|
| 3,001,121 | 9/1961 | Kerr, Jr. | 310/68 D |
| 3,184,625 | 5/1965 | Farison | 310/68 D |
| 3,866,072 | 2/1975 | Nagai | 310/68 D |
| 3,959,676 | 5/1976 | Striker | 310/68 D |
| 4,065,686 | 12/1977 | Moore | 310/68 |
| 4,169,282 | 9/1979 | Allport et al. | 363/145 |
| 4,232,238 | 11/1980 | Saito et al. | 310/68 D |
| 4,288,711 | 9/1981 | Hagenlocher et al. | 310/68 D |
| 4,419,597 | 12/1983 | Shiga et al. | 310/68 D |
| 4,606,000 | 8/1986 | Steele et al. | 363/14 J |
| 4,720,645 | 1/1988 | Stroud | 310/68 D |
| 4,799,309 | 1/1989 | Cinzori et al. | 310/68 D |
| 4,952,829 | 8/1990 | Armbruster et al. | 310/68 D |
| 4,980,588 | 12/1990 | Ogawa | 310/68 D |
| 5,043,614 | 8/1991 | Yockey | 310/68 D |
| 5,095,235 | 3/1992 | Kitamura | 310/68 D |
| 5,233,246 | 8/1993 | Yockey | 310/71 |
| 5,331,231 | 7/1994 | Koplin et al. | 310/68 D |
| 5,451,823 | 9/1995 | Deverall et al. | 310/68 D |
| 5,453,648 | 9/1995 | Bradfield | 310/71 |

Primary Examiner—Steven L. Stephan
Assistant Examiner—Elvin G. Enad
Attorney, Agent, or Firm—Mark S. Sparschu

[57] ABSTRACT

An alternator and method of forming an alternator with a rectifier internal to the alternator housing are disclosed in which a plurality of positive diodes and negative diodes each has a anode electrode and a cathode electrode. The stator of the alternator has a plurality of stator windings, each winding having a first end and a second end. The rectifier bridge member has electrically conductive circuit traces each having a plurality of substantially coplanar solder pads adapted to receive either an anode electrode of a respective positive diode, a cathode electrode of a respective negative diode or a first or second end of a respective stator winding. The rectifier bridge member also has an electrically conductive plate for electrically interconnecting the cathodes of the positive diodes. A housing for enclosing one end of the alternator has an interior and exterior portion. The interior portion is adapted to receive the rectifier bridge member so that a generally planar surface is formed with the rectifier bridge member and the housing. The housing also has a seat extending axially from the housing for mountably receiving the anodes of the negative diodes.

12 Claims, 4 Drawing Sheets

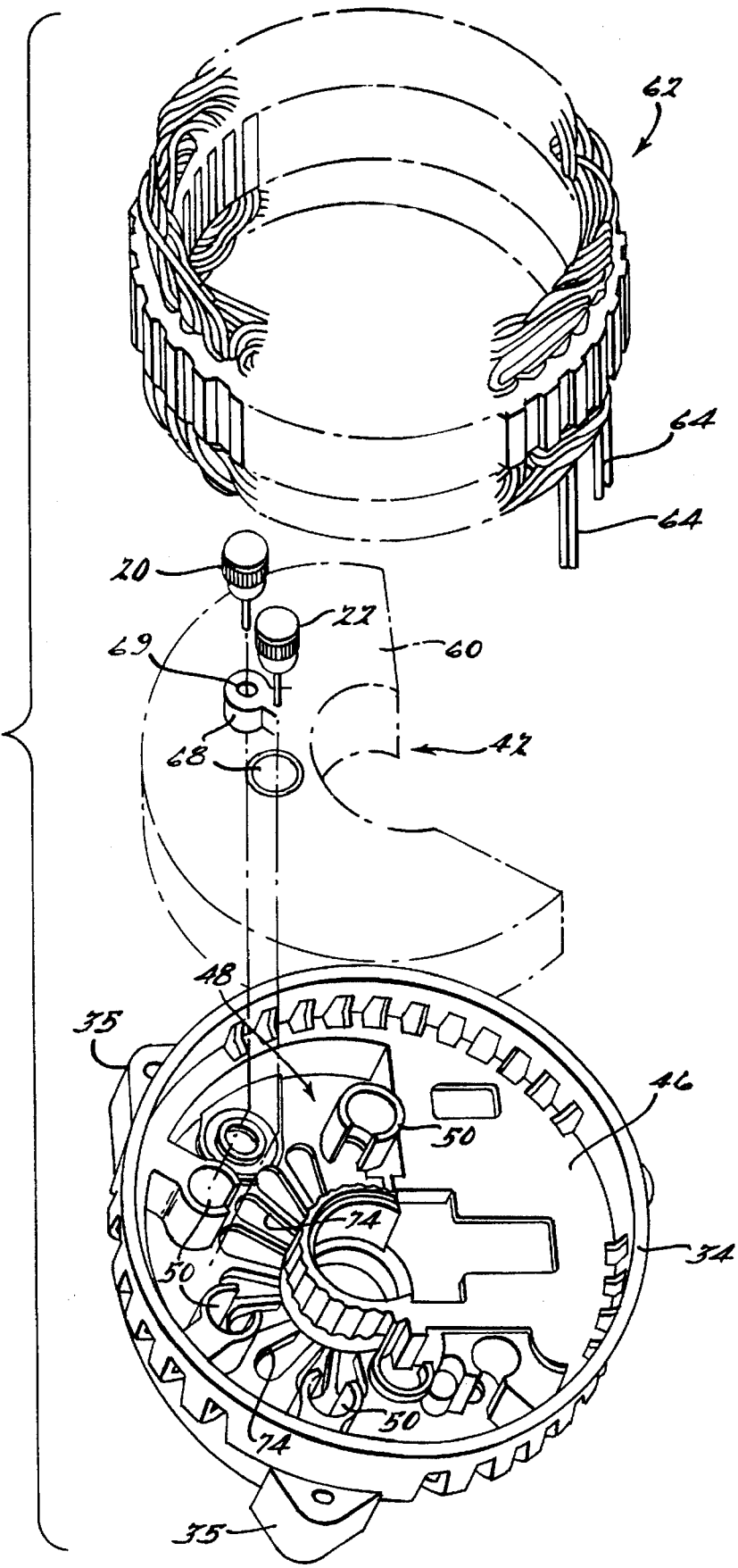

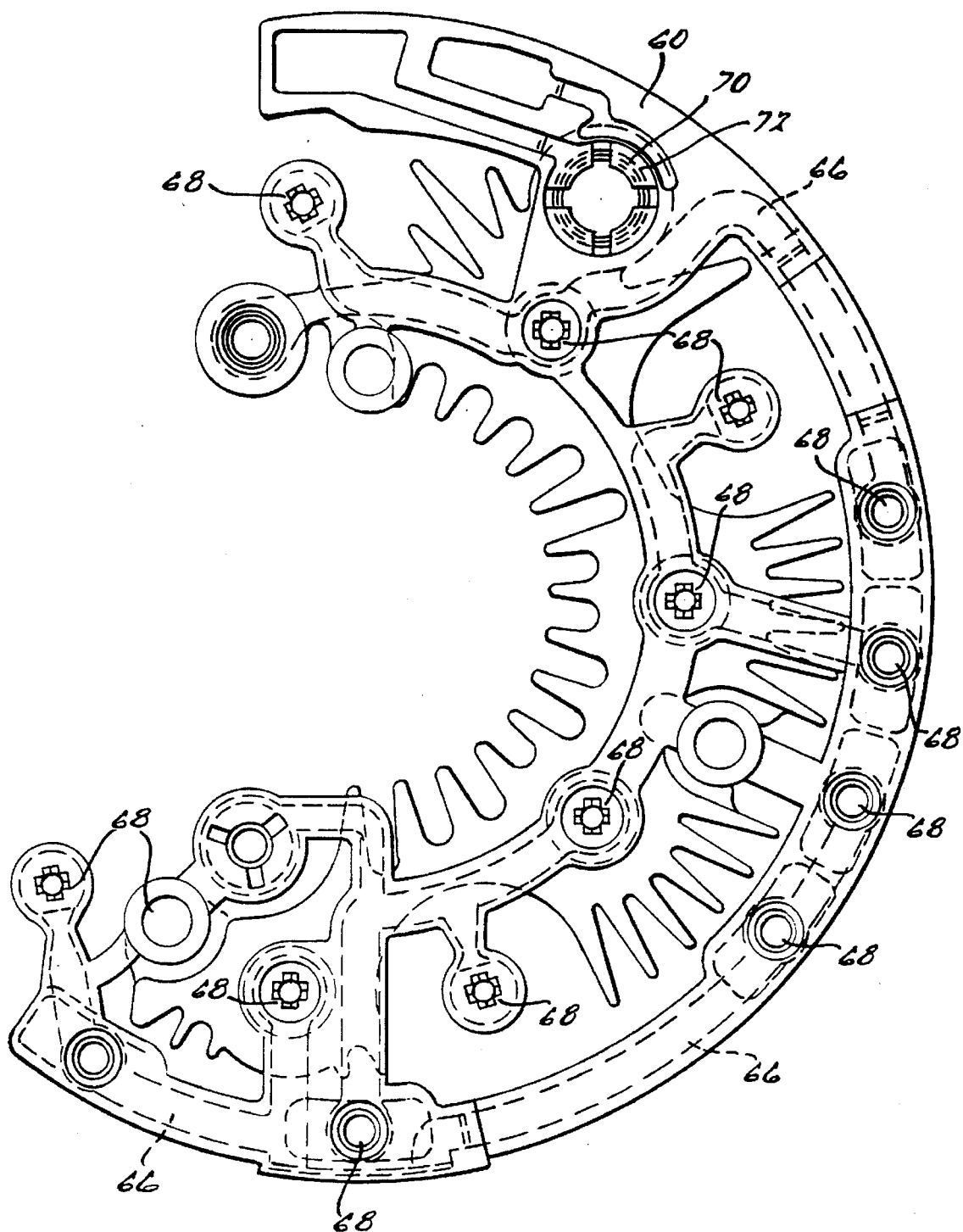

ALTERNATOR WITH INTERNAL RECTIFIER BRIDGE ASSEMBLY

BACKGROUND OF THE INVENTION

The present invention relates generally to the field of alternators as used, for example, to supply DC electrical power to motor vehicles and, more particularly, to an improved alternator having a rectifier bridge assembly contained within the alternator housing.

A three phase alternator rectifier bridge, such as used in a motor vehicle alternator, comprises three "negative" diodes having their anodes connected to a ground terminal and three "positive" diodes having their cathodes connected to a voltage output terminal. Each of the cathodes of the negative diodes are connected to one of the anodes of the three positive diodes and to one of three stator windings of an alternator. In the interest of conserving space and facilitating the manufacture and repair of alternators, the diodes used to form rectifier bridge circuits have been packaged together as a unit which preferably is mounted within the housing of the alternator. For example, U.S. Pat. No. 3,184,625 describes a technique for mounting diodes on metal plates within the housing of an alternator. The metal plates provide electrical interconnection to common terminals for each set of diodes. However, numerous wire-to-wire solder connections are required to interconnect the diodes in the rectifier unit.

Compact packaging of a rectifier creates a problem in connection with the dissipation of heat which is generated by the conduction of substantial currents through the diodes of the bridge circuits. U.S. Pat. Nos. 3,539,850, 3,925,809, 3,959,676, 4,218,694, 4,307,437, 4,321,664, 4,538,169, 4,799,309 and 4,835,427 all show various techniques for packaging diodes in a manner that will facilitate heat dissipation. In particular, U.S. Pat. No. 3,959,676 describes sandwiching the diodes between a pair of heat sinking DC terminal plate members and a generally U-shaped circuit board member comprised of conductive strips embedded within and insulated by a plastic material. The resulting unitary composite body is mounted within the housing end plate of an alternator. U.S. Pat. No. 4,538,169 describes another sandwiched diode structure wherein a base is mounted on the alternator housing case to transfer heat directly thereto.

Commonly owned U.S. Pat. No. 5,043,614 describes an alternator having a rectifier bridge mounted to the exterior of the alternator housing. Such a configuration has the desired characteristic of being easily manufactured and has rapid dissipation of heat. Packaging flexibility is limited with such a design because the rectifier bridge limits space that would otherwise be available for mounting the alternator to the engine. Because of the decreasing underhood space in automobile designs, providing an alternator with packaging flexibility is increasingly desirable.

It is therefore desirable to provide an alternator design which combines the advantages of packagability, manufacturability and cost while maintaining good heat dissipation.

SUMMARY OF THE INVENTION

The state of the art is advanced by the method and apparatus of the present invention which defines an alternator rectifier bridge incorporated within an alternator housing while still retaining the desired characteristic of ease of manufacturability. Half of the diodes of the rectifier bridge are inserted into apertures formed into a portion of an alternator housing such that the housing serves as one output for the alternator and also as a massive heat sink to dissipate heat generated in the diodes. Typically, the diodes inserted into the housing are negative diodes with their anode electrodes being inserted and their cathode electrodes extending beyond the housing. The other half of the diodes of the rectifier bridge are inserted into apertures formed in a electrically conductive plate. Typically, the diodes inserted into the plate are positive diodes with their cathode electrodes being inserted and their anode electrodes extending beyond the plate. The plate is assembled with a rectifier circuit member and together with traces embedded in the circuit member serve to interconnect electrodes of the diodes to stator windings of the alternator. The traces also provide other electrical connections required for efficient manufacture and proper operation of the alternator.

Briefly, the alternator has a plurality of positive diodes and negative diodes each of which has an anode electrode and a cathode electrode. The alternator also has a plurality of stator windings, each winding having a first end and a second end. The rectifier bridge has electrically conductive circuit traces each having a plurality of substantially coplanar solder pads adapted to receive either an anode electrode of a respective positive diode, a cathode electrode of a respective negative diode or a first or second end of a respective stator winding. The rectifier bridge also has an electrically conductive plate for electrically interconnecting the cathodes of the positive diodes. A housing for enclosing one end of the alternator has an interior and exterior portion. The interior portion is adapted to receive the rectifier bridge so that a generally planar surface is formed with the rectifier bridge and the housing. The housing also has a seat extending axially from the housing for mountably receiving the anodes of the negative diodes.

BRIEF DESCRIPTION OF THE DRAWINGS

FIG. 2 is an exploded perspective view of a portion of an alternator in accordance with the present invention.

FIG. 5 is a bottom view of a rectifier bridge for use in the present invention.

DETAILED DESCRIPTION OF THE PREFERRED EMBODIMENT

Figure 1:
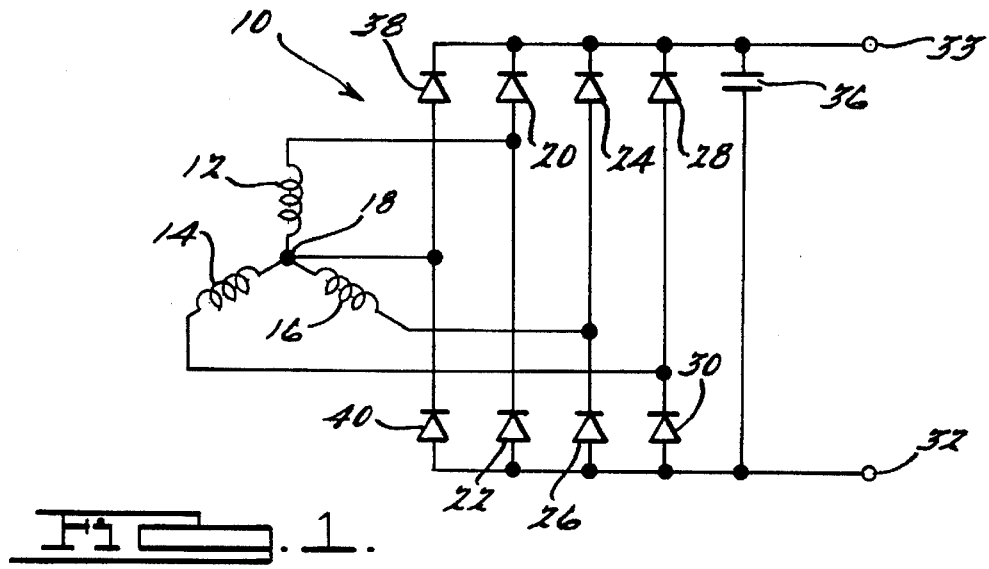
FIG. 1 is an electrical schematic diagram of an alternator rectifier bridge.
Figure 3:
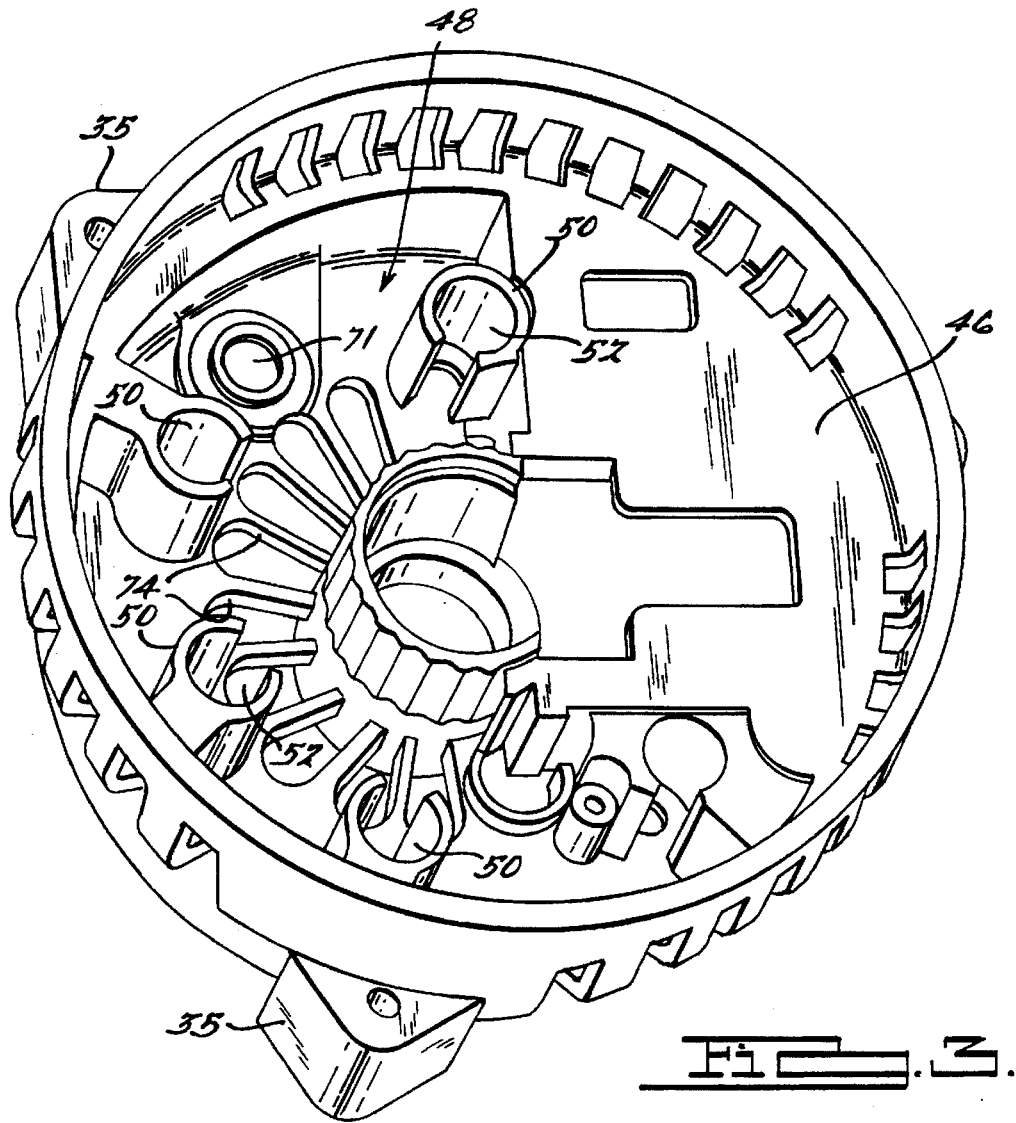
FIG. 3 is plan view of the inside of an alternator housing end plate in accordance with the present invention.
Figure 4:
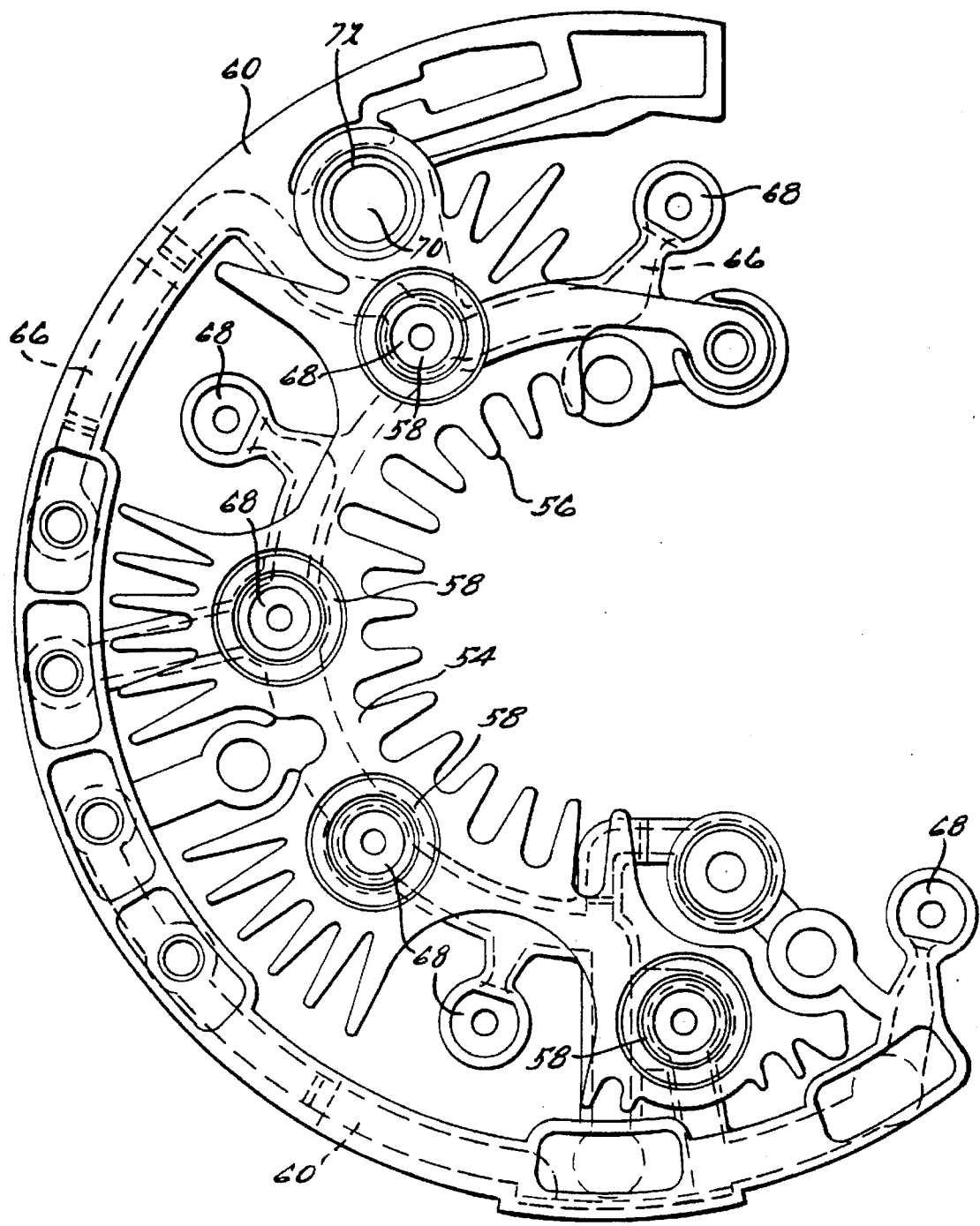
FIG. 4 is a plan view of a rectifier bridge for use in the present invention.

Referring to FIG. 1, a typical alternator bridge circuit 10 is connected to stator windings 12, 14, 16 of an alternator. The rectifier circuit 10 may be used with any type of alternator but is particularly applicable to alternators used for electrical power systems in motor vehicles. Typically, motor vehicle alternators include aluminum housings and are positioned adjacent the vehicle's engine in the engine compartment.

One end of each stator winding 12, 14, 16 is interconnected at a neutral node 18 into a wye configuration. The other end of winding 12 is connected to the anode electrode of a diode 20 and the cathode electrode of a diode 22. The other end of winding 14 is connected to the anode electrode of a diode 28 and the cathode electrode of a diode 30. The other end of winding 16 is connected to the anode electrode of a diode 24 and the cathode electrode of a diode 26. The diodes 22, 26 and 30 have their anode electrodes connected to a negative output terminal 32 and are usually referred as "negative" diodes. The diodes 20, 24 and 28 have their cathode electrodes connected to a positive output terminal 34 and are usually referred to as "positive" diodes. The negative output terminal 32 is at a lower voltage than the positive output terminal 34 and is typically connected to the alternator housing which is at ground potential.

A capacitor 36 is coupled between the output terminals 32 and 34 for noise suppression, for example, to prevent interference with radio reception. An additional pair of high current diodes 38 and 40 have their cathode electrode and anode electrode, respectively, connected to the neutral node 18 and their anode electrode and cathode electrode, respectively, connected to output terminals 32 and 33 to provide additional current output at high operating speeds.

Referring now to FIGS. 2-5, a cup shaped housing for enclosing one end of an alternator comprises an alternator housing end plate 34 in the illustrated embodiment of the present invention. End plate 34 has an interior and exterior portion. The interior portion shown in FIG. 3, has a generally planar surface 46 and a recessed portion 48 for receiving a rectifier bridge assembly 42 shown in FIGS. 4 and 5. Recessed portion 48 of end plate 34 contains vent holes 74 providing air flowing through end plate 34 to further increase the heat dissipation from rectifier bridge member 42. Mounting bosses 35 can be placed at any selected locations on the exterior side of end plate 34 to secure the alternator to the engine.

A plurality of generally circular seats 50 are integrally formed in the recessed portion of end plate 34. Seat 50 has an axial opening. The diameter of the opening of seat 50 is determined by 52 the diameter of which fits the anode electrode of negative diodes 22, 26 or 30, i.e., so that the anode electrode of the diode is secured when press fit into place.

Rectifier bridge member 42 is physically connected between a stator core 62 and an end plate 34 as shown in FIG. 2. Lead wires 64 extend from the multiple windings of stator core 62 for connection to rectifier member 42.

Bridge member 42 comprises a plurality of positive diodes 20, 24, 28, one of which is shown in FIG. 2, with each positive diode having an anode electrode and a cathode electrode. Bridge member 42 also has a plurality of negative diodes 22, 26, 30 which include an anode electrode and a cathode electrode. The diodes generally have a cylindrical body member with one lead extending axially from the center of the body. The body of the positive diode acts as the cathode electrode and the axial lead acts as an anode electrode. The opposite is true for the negative diodes, i.e., the cylindrical body is the anode electrode and the axial lead is the cathode electrode.

Rectifier bridge member 42 is comprised of a conductive plate 54 which is made from a several millimeter thick machined or extruded piece of copper and is partially encapsulated in plastic or other electrically nonconductive material. The encapsulation process can be done by a process such as that disclosed in U.S. Pat. No. 5,043,614. Contained within plastic encapsulation 60 are a plurality of conductive traces 66 used for interconnection as described below. Conductive plate 54 has a positive voltage potential as compared to the voltage potential of end plate 34. Apertures 58 formed in conductive plate 54 are sized to mountably receive cathodes of positive diodes 20, 24 and 28. Conductive plate 54 acts as a heat sink to dissipate heat from diodes 20, 24, and 28. To increase the surface area and consequently the heat dissipation of conductive plate 54, cooling fins 56 are added to conductive plate 54 which generally extend in an axial direction to apertures 58.

Conductive plate 54 is electrically isolated from end plate 34 by a plastic encapsulation member 60 which surrounds at least a portion of plate 54. Preferably, cooling fins 56 remain exposed to the surrounding air to maximize cooling efficiency. As an alternative, the conductive plate 54 can remain a separate piece not embedded in plastic. In that case, conductive plate 54 would be fastened to plastic encapsulation member 60 during the assembly process.

Conductive traces 66 connect various anode/cathode electrodes of pairs of the diodes 20, 22; 24, 26; 28, 30; 38, 40 to the stator lead wires 64 of the alternator before plastic encapsulated rectifier bridge member 42 is secured to the alternator housing end plate 34. Conductive traces 66 have solder pads 68 each having an aperture 69 for receiving respective cathodes of negative diodes 22, 26, and 30; anodes of positive diodes 20, 24, and 28; and stator lead wires 64. The preferred method for interconnecting these components with solder pad 68 is by wave soldering. Therefore, solder pads 68 lie substantially in the same plane. The interconnections formed by conductive traces 66 form rectifier circuit 10 as shown in FIG. 1.

A battery terminal 70 is electrically connected to and extends out from conductive plate 54 through a hole 71 in end plate 34 to link the alternator with the car battery or voltage regulator. Battery terminal 70 is electrically insulated from end plate 34 by an insulator 72 which is preferably integrally formed with plastic encapsulation member 60 to a point beyond where battery terminal 70 leaves end plate 34. Insulator 72 can also be a separately formed sleeve which is inserted on battery terminal 70 during the assembly process.

Rectifier bridge member 42 is secured to end plate 34 by a screw, bolt, rivet, or other electrically conductive fastening means through threaded holes 74. Threaded holes 74 are lined with conductive material which is electrically connected to the appropriate conductive traces 66 at ground potential when placed within recessed portion 48.

In operation, the assembly of the above described alternator comprises several steps. A fixture (not shown) is provided for receiving the rectifier bridge after plastic encapsulation member 60 is formed around the exterior of conductive plate 54. The fixture is shaped so that it receives diodes and holds them in place during the wave soldering procedure described later. Once rectifier bridge member 42 is placed into the fixture, the positive and negative diodes are set into place. The cathodes of the positive diodes 20, 24 and 26 are press fit into conductive plate 54 so that each anode extends through its respective solder pad 68. The anodes of negative diodes 22, 26, and 30 are held by the fixture so that their cathodes extend through their respective solder pad apertures 69 in their respective solder pads 68.

Next, stator 62 is placed on the fixture so that stator winding lead wires 64 are placed through their respective solder pads 68.

The rectifier bridge, diodes, and stator windings are then wave soldered to the their respective solder pads.

Rectifier bridge member 42 is then removed from the fixture and placed into end plate 34 by tooling designed to not interfere with the integrity of solder joints formed during the soldering process. The anode electrodes of the negative diodes prior to this step had not been secured. When rectifier bridge member 42 is place into end plate, the anode electrodes of the negative diodes are aligned with the C-shaped seat portions of end plate 34.

Once aligned, the anode electrodes of the negative diodes are press fit into place. Rectifier bridge member 42 is then fastened to end plate 34 preferably by a conductive fastening means such as a bolt, screw or rivet so that the electrical path may be completed to the conductive traces 66 of rectifier bridge member 42.

What is claimed is:

1. An alternator comprising:

a plurality of positive diodes, each positive diode having an anode electrode and a cathode electrode;

a plurality of negative diodes, each negative diode having an anode electrode and a cathode electrode;

a plurality of stator windings, each stator winding having a first end and a second end;

a rectifier bridge member having electrically conductive circuit traces electrically connected to a plurality of substantially coplanar solder pads adapted to receive either a respective anode electrode of a respective positive diode, a respective cathode electrode of a respective negative diode, a respective first end of a respective stator winding, or a respective second end of a respective stator winding, said rectifier bridge having an electrically conductive plate receiving said cathodes of said positive diodes; and housing means for enclosing one end of the alternator having an interior and exterior portion, said interior portion adapted to receive said rectifier bridge member so that a generally planar interior surface is formed by said rectifier bridge member and said housing means, said housing means having seat means extending axially for mountably receiving said anode electrodes of said negative diodes.

2. The alternator as recited in claim 1 wherein said solder pads have solder pad apertures adapted to receive either an anode electrode of a respective positive diode, a cathode electrode of a respective negative diode or a first end of a respective stator winding.

3. The alternator as recited in claim 1 wherein said seat means comprises a plurality of C-shaped opening.

4. The alternator as recited in claim 1 further comprising a capacitor electrically connected between said electrically conductive plate and a predetermined one of said electrically conductive circuit traces.

5. The alternator as recited in claim 1 wherein said rectifier bridge member further comprises a plurality of securing apertures adapted to receive fastening means for securing said rectifier bridge member to said housing means.

6. The alternator as recited in claim 1 wherein said rectifier bridge member has a battery terminal electrically connected to a predetermined one of said electrically conductive circuit traces.

7. The alternator as recited in claim 6 wherein said housing means has a hole therein and wherein said battery terminal has an insulating sleeve extending from said rectifier bridge member, said insulating sleeve passing through said hole to insulate said battery terminal from said housing means.

8. The alternator as recited in claim 1 wherein said electrically conductive plate includes cooling fins.

9. The alternator as recited in claim 8 wherein said cooling fins comprise radial extensions of said electrically conductive plate circumscribing at least one of said cathodes of said positive diodes.

10. The alternator as recited in claim 1 wherein said housing means further comprises vent holes.

11. The alternator as recited in claim 1 further comprising a mounting boss located on said housing means juxtaposed to said rectifier bridge member.

12. A method of making an alternator having a housing with an axially extending seat portion, a plurality of positive and negative diodes, each diode having a anode electrode and a cathode electrode, a plurality of stator windings, each of said windings having a first end and a second end, and a rectifier bridge member having an electrically conductive plate and electrically conductive circuit traces connected to a plurality of coplanar solder pads each solder pad having a solder pad aperture adapted to receive either an anode electrode of a respective positive diode, a cathode electrode of a respective negative diode or a first end of a respective stator winding, said method comprising the steps of:

locating said positive diodes in said rectifier bridge member so that each respective anode electrode extends through a respective solder pad aperture and so that each respective cathode is mounted to said electrically conductive plate;

locating said negative diodes in a fixed location relative to said rectifier bridge member so that said cathode electrode of said negative diodes extends through respective solder pad apertures;

locating said first and second ends of said stator windings in said rectifier bridge member to extend through respective solder pad apertures;

wave soldering said anode electrodes of said positive diodes said cathode electrodes of said negative diodes and said first ends and said second ends of said stator windings to their respective solder pads; and placing said rectifier bridge member in said housing while press fitting said anode electrodes of said negative diodes into said axially extending seat portion.

* * * * *